Dec. 12, 1950
U. O. BLOMQUIST ET AL
2,533,991
DUST EXTRACTING DEVICE
Filed Nov. 10, 1948
3 Sheets-Sheet 1
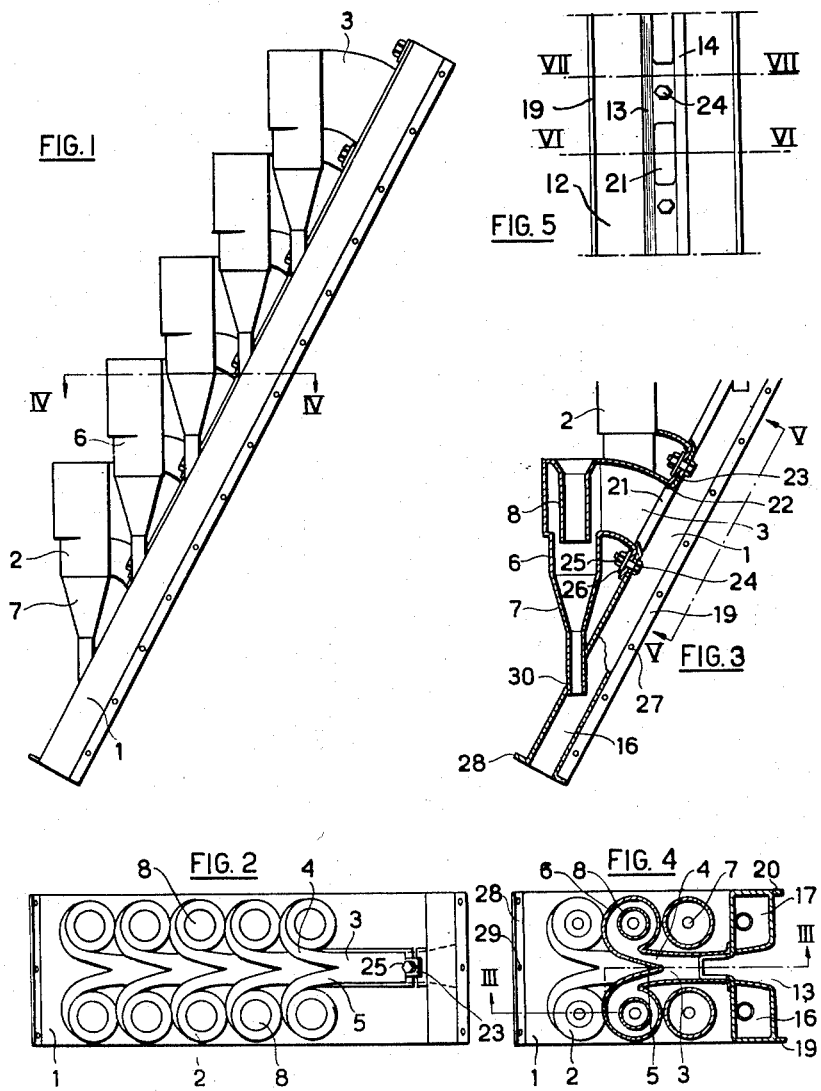
INVENTORS
UNO OLOF BLOMQUIST
SVEN WERNER WALLIN
BY THEIR ATTORNEYS
Howson & Howson Dec. 12, 1950 U. O. BLOMQUIST ET AL 2,533,991
DUST EXTRACTING DEVICE
Filed Nov. 10, 1948 3 Sheets-Sheet 2
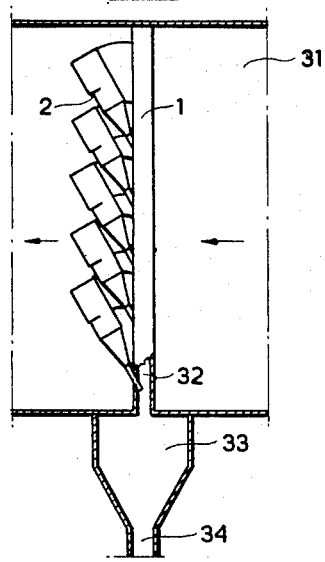
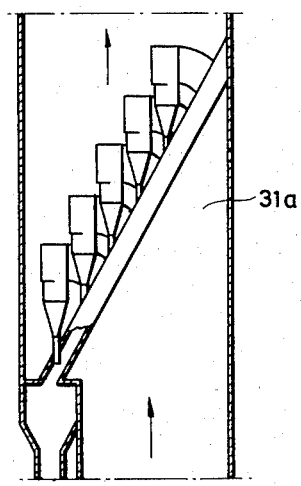
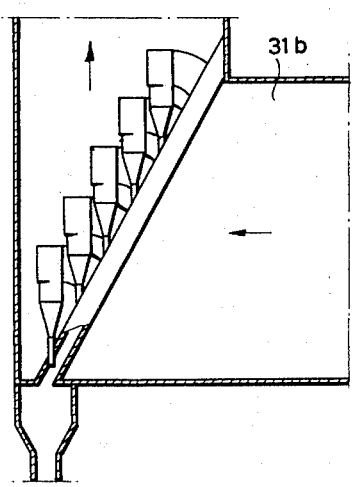
INVENTORS
UNO OLOF BLOMQUIST
SVEN WERNER WALLIN
BY THEIR ATTORNEYS
Howson & Howson Dec. 12, 1950 U. O. BLOMQUIST ET AL 2,533,991
DUST EXTRACTING DEVICE Filed Nov. 10, 1948 3 Sheets-Sheet 3

INVENTORS
UNO OLOF BLOMQUIST
SVEN WERNER WALLIN
BY THEIR ATTORNEYS

Howson & Howson

Patented Dec. 12, 1950

2,533,991

UNITED STATES PATENT OFFICE 2,533,991

DUST EXTRACTING DEVICE

Uno Olof Blomquist, Vasteras, and Sven Werner Wallin, Jonkoping, Sweden, assignors to A. B. Svenska Flaktfabriken, Stockholm, Sweden Application November 10, 1948, Serial No. 59,242
In Sweden September 4, 1948

10 Claims. (Cl. 183—81)

The present invention relates to an arrangement in dust extracting devices of the kind that may be built-in into a channel through which is passing a medium to be purified. More particularly the invention consists of rows of small cyclones working in parallel and located at a wall covering the channel area and provided with holes for the inlets of the cyclones, respectively.

One object of the invention is to provide an improved cyclone purifier of this kind made up of elements which may be mounted together in various ways in order to adapt the cyclone extractor to channels having different cross-sectional areas. It will thus be possible to make the cyclones in standard units having one or more rows of small cyclones within one unit, which will then be mounted laterally or longitudinally with other such units, as required, in order to form a cyclone extractor of the desired size. Another object of the invention is to provide a dust extracting device comprising parallel channel and chamber portions defined by a common wall and having a plurality of dust extracting cyclones constructed individually or in pairs with their inlets connected to the channel portions through openings in said wall and with their conical outlets connected to the chamber portion through other openings in the wall. In addition, it is an object of the invention to arrange the walls so that dust entering into the chambers by sudden fall may be caught in collecting drums for the dust located beneath the said chambers and connected thereto.

Still another object of the invention is to connect the cyclones to the chambers in such a manner that the dust from the cyclones falls downwardly therein. Finally it is an object of the invention to use such securing means for the attachment of the cyclones to the walls as will simultaneously assist in securing two cyclones being independent of one another. Other features of the invention will be seen by some embodiments which will be described more in detail hereinafter.

The invention is substantially characterised by the fact that the wall is made up of demountable wall elements each being adapted to form a channel, which is open towards the inlet side of the wall for the medium and at least one chamber in parallel with said channel, the wall of the channel being provided with holes for the connection of the inlet tubes of the cyclones and the wall of the chamber at the outlet side for the medium being provided with openings for the insertion from above of the conical part of the cyclones to evacuate the dust, and by the fact that the cyclones are placed in a row in parallel at the outlet side of the wall element for the medium and forming an acute angle between the axis of the cyclone and the longitudinal direction of the wall element which is provided for the free fall of dust through the chamber.

The invention is illustrated in some of its embodiments in the accompanying drawing.

Fig. 1 is a side view of a standard element comprising a wall element provided with cyclones.

Fig. 2 is an elevation of Fig. 1, seen from above.

Fig. 3 shows part of the arrangement according to Fig. 1, and

Fig. 4 shows part of the arrangement of Fig. 2, Fig. 3 being a section of Fig. 4 along line III—III, and Fig. 4 a section of Fig. 1 along line IV—IV.

Fig. 5 shows a detail of Fig. 3 seen in the direction of and between the arrows V—V.

Figs. 6 and 7 are sections of Fig. 5 along line VI—VI and VII—VII, respectively.

Figures 8, 9 and 10 illustrate various methods of building-in the cyclone devices into channels.

Figure 11:
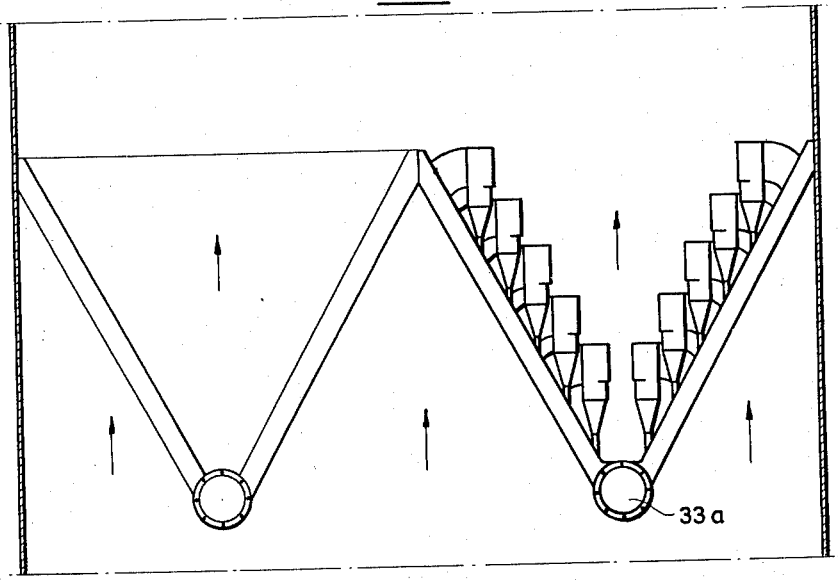
Figure 12:
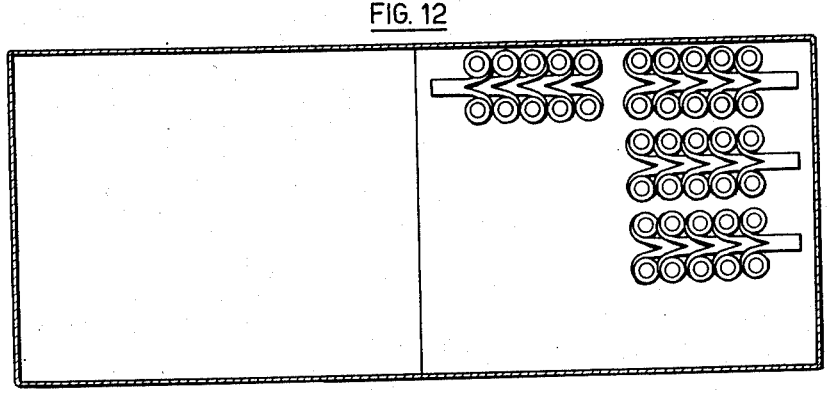

Fig. 11 demonstrates another way of building-in the cyclone device in a larger channel, and Fig. 12 is a top elevation of Fig. 11.

The cyclone device according to Figures 1–7 comprises a standard element consisting of the wall element 1 and the cyclones 2. The cyclones are here twin-cyclones, i. e. two separate cyclones having their inlet tubes 4 and 5 branched from a common inlet 3. Each cyclone consists of a jacket, a conical portion 7 forming the outlet tube for the dust separated by the cyclone and a central tube 8 forming the outlet for the medium, from which the dust is extracted and which may, for instance, consist of flue gases. The wall element 1 is made up of parallel plane plates. The bottom plate 9 is secured to the side plates 10 and 11 at right angles. With these plates the plates 12, 13, 14, and 15 are connected, so that the chambers 16 and 17, the channel 18 and the flanges 19 and 20 are formed. In the bottom plate 9 of the channel 18 are provided holes 21, the edges of which are provided with a projecting flange portion 22. Around this flange-portion 22 there are connected inlet tubes 3, which for the purpose are provided with flanges 23 and are secured to the wall element 1 by means of pins 24, nuts 25 and washers 26. As will be seen by Fig. 3 one and the same pin with its nut and washer fixes two adjacent flanges of separate cyclones or twin-cyclones. The flanges 19 and 20 are provided with holes 27 for the joining of several wall elements adjacent to each other by means of pin joints or screws passing through the holes. The ends of the wall elements are likewise provided with flanges 28 for connecting together several of the wall elements in longitudinal direction or for the connection of the elements to collecting drums, as will be described more fully hereinafter. These latter flanges are likewise provided with holes 29 for the screw joints. The plates 13 and 14 form an acute angle towards the bottom of the channel 18 in order to facilitate the guiding of the medium which is to be purified towards the holes 21 and into the branch pipes of the cyclones.

The wall element 1 here described is particularly constructed for said twin-cyclones, the wall element for this reason having two chambers for the collection of extracted dust and a channel in-between them for the introduction of the medium to be purified into the branch inlet pipes of the twin-cyclones. The wall element may, however, also be constructed for a row of single cyclones only, and will in this case only consist of one chamber and a channel in parallel with same. This embodiment is not shown in the drawings, as it will easily be understood. If, for instance, the chamber 16 is removed in Fig. 4 and only its wall 13 is kept and provided with a flange corresponding to flange 19, a wall element is obtained for only one row of single cyclones, as desired. This embodiment is also included in the invention.

The conical portion of the cyclones, i. e. the part removing the dust extracted by the cyclone, will be inserted from above through the openings 30 provided in those parts of the plate 9 which limit the chambers 16 and 17. According to the invention it is of importance that the wall elements take such a position in the channel, that dust entering into the chambers 16 and 17 from the cyclones may fall down freely into collecting drums at the bottom of the chambers. Considering the working manner of the cyclone it is quite obvious that the lower part of each cyclone is constituted by its conical portion.

Owing to the structure described it is easy to mount and demount both the separate cyclones and the twin-cyclones and the various wall elements, which is of importance particularly with respect to the maintenance, care and change of one detail or the other.

In Fig. 8 the wall elements are arranged vertically in the channel 31, and the cyclones are arranged at the wall elements in such a way that the axes of the cyclones form acute angles with the longitudinal direction of the wall elements. The direction of flow of the medium in the channel 31 is denoted by arrows. The dust falls from the chamber 32 into the collecting drum 33, which is common for a number of chambers 32 and is evacuated from the same through the pipe 34, if desired, by means of a conveying screw, which, however, is not shown here.

Fig. 9 differs from Fig. 8 by the fact that the channel 31a has another direction and the wall elements with their cyclones are arranged at another inclination. In this case the axes of the cyclones are vertical and the wall elements inclining. The direction of flow of the medium in the channel is in this case likewise marked by arrows.

Fig. 10 is a modification of Fig. 9 and differs from the same only in that the channel 31b forms a knee, in which the cyclone device is arranged. The arrows show the direction of flow in the channel.

In the Figures 11 and 12 the wall elements are joined to form a V, one element lying beside the other. The figure also shows that several such V-forms may be joined together. At the point where the legs of the V meet there is arranged a common collecting drum 33a for the chambers of each leg, from which collecting drum the dust is removed, for instance, by means of a conveying screw (not shown). Arrows denote the direction of flow of the medium in Fig. 11.

It should be noted that the medium in a channel when having passed the cyclone device according to the invention may maintain the direction of flow it had before passing the cyclones. It is a special advantage of the invention that it does not require any special housing for the apparatus as the walls of the channels are used for this purpose.

Without departing from the idea of the invention alterations of the same may be taken into consideration. The wall elements may thus be made in other ways than those here shown and the cross sections of the chambers and channels may be otherwise. Other joints for joining together the wall elements and connect them to the collecting drums may also be used. Finally the wall elements may be built together forming other figures than those of V-shape or W-shape.

Having now described our invention, what we claim as new, and desire to secure by United States Letters Patent, is:

1. In dust extracting apparatus of the type adapted to be built into a channel and comprising a plurality of cyclone devices each having an inlet and an outlet, a wall structure including portions defining a continuous channel for the passage of a medium to be purified and a continuous chamber extending parallel to and adjacent said channel to receive the material extracted from said medium, said channel having a plurality of outlet openings for the medium at predetermined intervals longitudinally therein and said chamber having a plurality of inlet openings thereto spaced longitudinally of the chamber and corresponding in number to said channel outlet openings, and said cyclones being disposed in alignment outwardly adjacent the wall structure and each cyclone having its inlet connected to one of said channel outlet openings and its outlet connected to the corresponding inlet opening of said chamber.

2. In dust extracting apparatus of the type adapted to be built into a channel and comprising a plurality of cyclone devices each having an inlet and an outlet, a wall structure including portions defining a continuous central channel for the passage of a medium to be purified and a pair of continuous parallel chambers at respectively opposite sides of said channel to receive the material extracted from said medium, said central channel having a plurality of outlet openings for the medium at predetermined intervals longitudinally therein and said parallel chambers each having a plurality of inlet openings thereto spaced longitudinally of the chamber and corresponding in number to said channel outlet openings, the said plurality of cyclones being arranged in parallel aligned groups outwardly adjacent the wall structure with each cyclone in one group having its inlet connected to one of said channel openings and its outlet connected to the corresponding inlet opening in one of said chambers and the cyclones in the other group thereof each having its inlet connected to another one of said channel outlet openings and its outlet connected to the corresponding inlet opening in said other chamber.

3. Apparatus as claimed in claim 1 wherein the wall structure is provided with apertured flanges along its opposite sides and ends by means of which the wall structure may be secured to adjacent wall structures of similar construction.

4. Apparatus as claimed in claim 1 wherein the wall structure is provided with apertured flanges along its opposite sides and ends by means of which the wall structure may be secured to adjacent wall structures of similar construction, and a collector common to all of said wall structures is connected thereto to receive the extracted material for their respective chambers.

5. Apparatus as claimed in claim 1 wherein the said chamber diminishes in its cross-sectional area toward the outlet opening therein.

6. Apparatus as claimed in claim 1 wherein the inlet to each cyclone comprises a tube and the channel outlet openings are provided with projecting flanges constructed to fit interiorly of the said inlet tubes.

7. Apparatus as claimed in claim 1 wherein the outlet to each cyclone comprises a tube and has its discharged end portion projecting inwardly of the chamber through an inlet opening therein.

8. Apparatus as claimed in claim 1 wherein the wall structure comprises bottom and side wall portions and top wall portions extending a predetermined distance inwardly from said side portions parallel to the bottom and then angularly with respect to each other into closing relation with said bottom to provide said relatively spaced parallel chambers and said central channel therebetween.

9. Apparatus as claimed in claim 2 wherein the inlet to each cyclone comprises a tube having edge flanges and a common fastening means is utilized to secure the flanged inlet tubes of the adjacent cyclones to said wall structure in communicating relation with the outlet openings of the channel therein.

10. Apparatus as claimed in claim 1 wherein the wall structure comprises bottom and side wall portions and a top wall portion extending a predetermined distance inwardly from one side parallel to the bottom and then into closing relation with the latter to provide the continuous channel and chamber.

UNO OLOF BLOMQUIST.
SVEN WERNER WALLIN.

REFERENCES CITED

The following references are of record in the file of this patent:

UNITED STATES PATENTS

| Number | Name | Date |
| --- | --- | --- |
| 1,333,325 | McGee | Mar. 9, 1920 |

FOREIGN PATENTS

| Number | Country | Date |
| --- | --- | --- |
| 402,693 | Great Britain | Dec. 7, 1933 |
| 466,983 | Great Britain | June 9, 1937 |